Aug. 20, 1968   P. C. HARVEY   3,397,579
THERMOCOUPLE GAUGE CONTROL
Filed Jan. 27, 1966

United States Patent Office 3,397,579
Patented Aug. 20, 1968

3,397,579
THERMOCOUPLE GAUGE CONTROL
Philip C. Harvey, Bedford, Mass., assignor to National Research Corporation, Newton Highlands, Mass., a corporation of Massachusetts
Filed Jan. 27, 1966, Ser. No. 523,381
2 Claims. (Cl. 73—399)

ABSTRACT OF THE DISCLOSURE

Thermocouple gauge control with inexpensive line voltage regulator comprising opposed Zener diodes and reactive impedance for limiting current. The control also comprises a circuit arrangement of the thermocouple which allows the DC voltage output of the thermocouple junction to be applied to the meter while limiting the AC power supply voltage which can be applied to the meter.

---

The present invention relates to thermocouple gauge controls and more particularly to a thermocouple gauge control having a simple, reliable power supply.

Thermocouple gauge controls have wide utility in the vacuum industry for measuring crude vacuums. They normally embody relatively inexpensive thermocouple gauge tubes containing a heater and a thermocouple element. It is highly desirable that the gauges be operable from plant line voltage without expensive regulating and protective circuits.

Accordingly, it is a principal object of the present invention to provide a thermocouple gauge control circuit embodying inexpensive elements.

Another object is to provide such a circuit which can be operated at line voltages subject to wide variations without affecting the thermocouple gauge reading.

Another object of the invention is to provide such a gauge control circuit having ease of adjustment and automatic temperature compensation.

Still another object of the invention is to provide for the use of unrectified AC power to operate the heater element while permitting simple DC measurement of the voltage generated at the thermocouple junction.

Other objects of the invention will in part be obvious and will in part appear hereinafter.

The invention accordingly comprises the apparatus possessing the construction, combination of elements and arrangement of parts which are exemplified in the following detailed disclosure and the scope of the application of which will be indicated in the claims.

Figure 1:
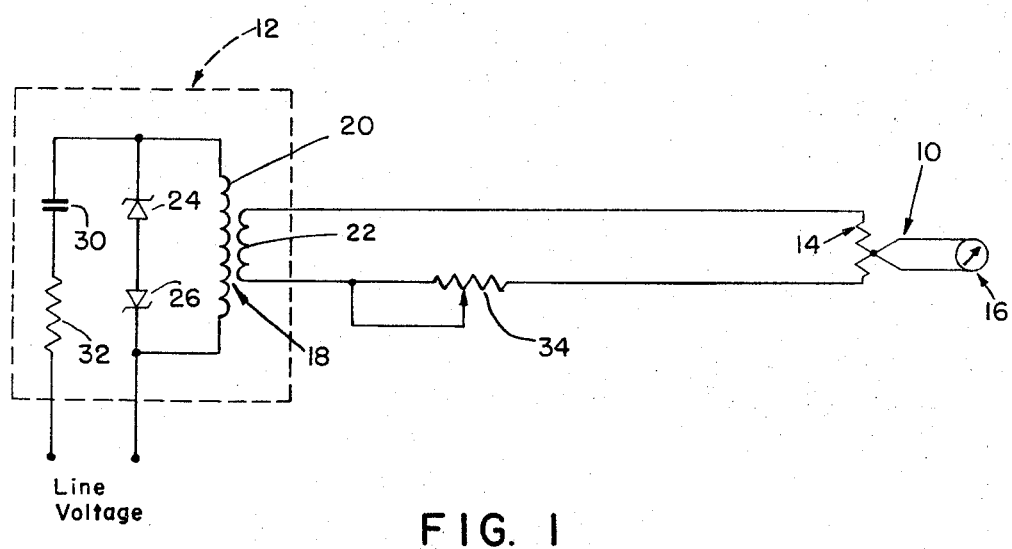
Figure 2:
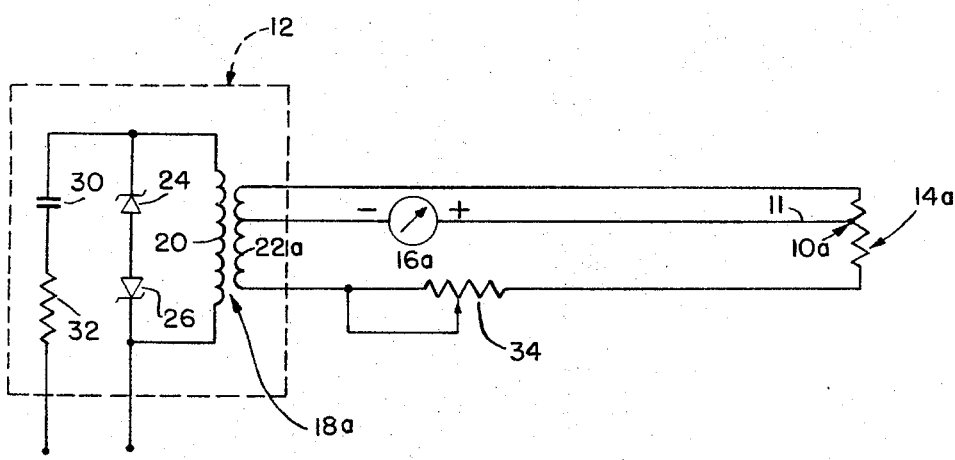

For a fuller understanding of the invention, reference should be had to the following detailed drawings wherein:

FIG. 1 is a diagrammatic, schematic representation of one embodiment of the invention; and FIG. 2 is a diagrammatic, schematic representation of a slightly modified arrangement of the metering circuit.

The basic objectives of the present invention are achieved by providing the unique arrangement for regulating the voltage fed to the heater element in a thermocouple gauge. A preferred embodiment of the invention is achieved by employing a step-down transformer operating the heater element from the line voltage, the heater element being connected to the secondary of the transformer. In order to limit the voltage fed to the primary of the transformer, irrespective of the fluctuations in line voltage, there are provided two Zener diodes connected in opposition to each other but in parallel series across the primary of the transformer. Thus for one-half cycle the first Zener diode will limit the voltage which can be maintained across the primary, the second diode then acting as a small series resistance. On the other half cycle, the second Zener diode serves a voltage limiting function and the first Zener diode is then acting as a small series resistance. When the Zener diodes have a breakdown voltage of approximately 6.8 volts and a forward voltage drop of about .6 volt, the voltage which can be generated across the primary of the transformer is limited to about 7.2 volts. A current limiting impedance (e.g., capacitor or resistor) is also provided in series with the line voltage lead to the primary to limit the current flow through the Zener diodes. A power limited resistor may also be used in series with the capacitor, this resistor also acting as a fuse to prevent disaster by fire in case of instrument failure.

In addition to limiting the voltage fed to the primary of the transformer the diodes are temperature compensating over a relatively wide range (between about —55° C. and 125° C.) additionally stabilizing the operation of the device. This is due to the fact that a 6.8 volt Zener diode has a +2 mv./° C. temperature coefficient in the reverse direction and approximately a —2 mv./° C. temperature coefficient in the forward direction.

In order to more fully understand the present invention, reference should be had to FIG. 1 wherein the thermocouple element is generally indicated at 10 and the power supply is encircled in dotted lines at 12. The thermocouple is in thermal contact with a heater element 14 and the output of the thermocouple is read by the microvoltmeter schematically indicated at 16. The heater element, thermocouple and meter are standard elements employed in the thermocouple gauge art.

The power supply 12 comprises a transformer 18 including a primary 20 and a secondary 22, the output of the secondary 22 being connected to heater element 14. The primary 20 of the transformer 18 is connected (via a series impedance) to line voltage. Across the primary are two Zener diodes 24 and 26, these diodes being shown as in opposition. In series with the primary winding 20 is a current limiting impedance shown as a capacitor 30 and a current limiting resistor 32. In the heater circuit of the transformer there is also provided an adjustable resistor 34 which can be used for zero setting the gauge.

Referring now to FIG. 2, there is illustrated a slight modification of the invention wherein the heater 14a is part of the thermocouple 10a, this being achieved by spot welding dissimilar wire 11 to the center of the heater element. In this case, the meter 16a is placed between the junction and a tap on the secondary 22a of the slightly modified transformer 18a. As noted, the tap on the secondary is not necessarily a center tap, but is placed so that the AC voltage on one side of the meter 10a is substantially equal to the AC voltage at the other side of the meter so that relatively little AC current flows through the meter. The other parts of the circuit are identical to those described in FIG. 1.

In one preferred embodiment of the invention, as exemplified by FIG. 2, the various circuit elements have the following values:

Heater 14a _____ 2.4Ω (Advance).
Thermocouple wire 11 _____ 1.4Ω (Nichrome).
Transformer 18a _____ 10:1.
Meter 16a _____ 11 mv.
Zener diodes 24 and 26 _____ 6.8 v.
Capacitor 30 _____ 2 μfd.
Resistor 32 _____ 33Ω, ½ w.
Resistor 34 _____ 5Ω.

While the above specific embodiments of the invention have been discussed, they should be considered as illustrative only and not for the purpose of limiting the invention.

What is claimed is:

1. A thermocouple gauge comprising a thermocouple element, means for heating said element, a main power supply operating from unregulated line voltage for applying a heating current with regulated voltage output to said heating means, a meter for reading the DC voltage output of said thermocouple, said power supply comprising a transformer with its primary winding arranged to be connected to line voltage via a voltage regulator, the regulator comprising a pair of Zener diodes connected in series and in opposition to each other with the output of the regulator being taken from across the two diodes to said primary winding, said diodes being connected to line voltage in series with a current limiting impedance which consists essentially of a reactance impedance member for limiting current to the diodes, the said diodes limiting the voltage at said primary winding on both half cycles of the AC line voltage, and the secondary winding of said transformer being connected to said heating means and wherein said diodes are selected with the temperature coefficient of reverse voltage of each equal and opposite in polarity to the temperature coefficient of forward voltage of the other.

2. The thermocouple gauge control of claim 1 wherein said impedance means is a condenser which provides the principal limitation of current flow through the diodes and wherein a current limited resistor is provided in series with said condenser as a safety element.

References Cited

UNITED STATES PATENTS 3,066,537  12/1962  Rivera _____ 73—399
3,158,756  11/1964  Brunner et al. _____ 307—88.5

DAVID SCHONBERG, *Primary Examiner.*

DONALD O. WOODIEL, *Assistant Examiner.*